C. A. SHOEMAKER.
TANK CAR.
APPLICATION FILED MAR. 26, 1913.
1,065,278.  Patented June 17, 1913.
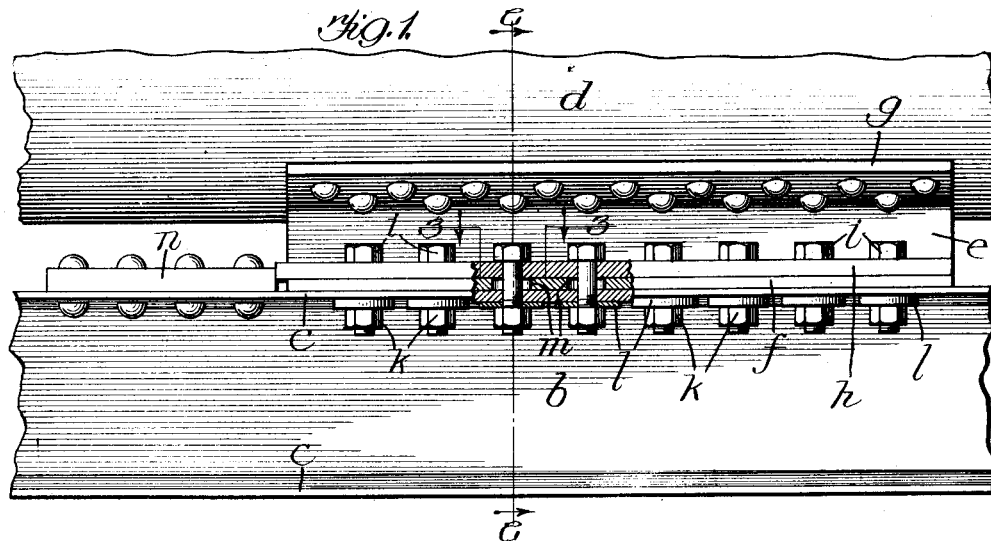
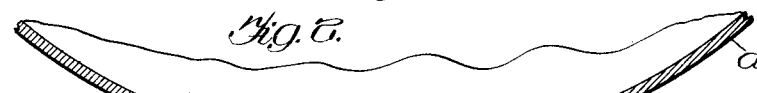
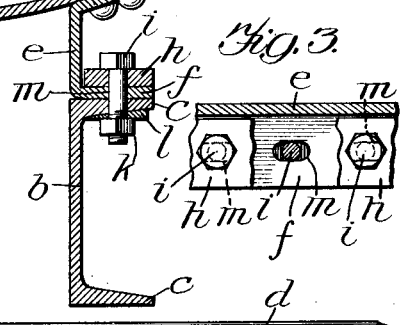
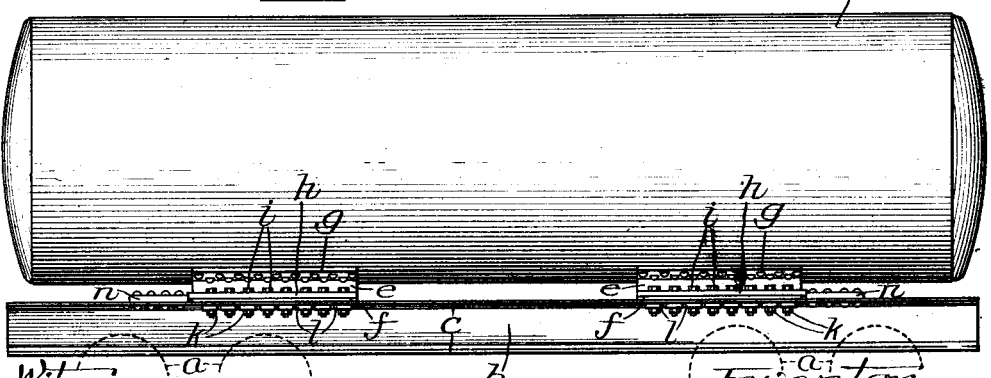
Witnesses:
Jno. H. Nelson Jr.
Edwin B. Nelson
Inventor
Charles A. Shoemaker.
By G. L. Cragg Atty.

UNITED STATES PATENT OFFICE.

CHARLES A. SHOEMAKER, OF CHICAGO, ILLINOIS.

TANK-CAR.

1,065,278.  Specification of Letters Patent.  Patented June 17, 1913.

Application filed March 26, 1913. Serial No. 756,900.

*To all whom it may concern:*

Be it known that I, CHARLES A. SHOEMAKER, citizen of the United States, residing at Chicago, in the county of Cook and State of Illinois, have invented a certain new and useful Improvement in Tank-Cars, of which the following is a full, clear, concise, and exact description, reference being had to the accompanying drawings, forming a part of this specification.

My invention relates to car structures and has for its object the provision of improved connections between car bodies and car body supports, which connections are of particular service in the construction of tank cars in which tanks constitute the car bodies, though I do not desire to be limited to the adaptation of my invention to tank cars.

In practising my invention, I prefer to employ two center sills formed out of channel iron as usual, the tank or other car body being secured to the top flanges of the center sills by fastening devices each having frictional contact at two of its surfaces with the center sills and parts carried thereby and which serve to prevent the tank or car body from being moved vertically and laterally with respect to the center sills, the means that secure these relationships of the tank or car body to the center sills, however, permitting the tank or car body to move longitudinally with respect to the center sills.

My invention also provides means for preventing shearing strains upon the anchoring bolts or rivets which are preferably employed to anchor a tank down. In my copending application Serial No. 568,088, filed June 21, 1910, I have disclosed and claimed a structure having some of the purposes of the present invention, the fastening devices in the prior structure being slidably supported upon the center sills to have frictional engagement therewith upon relative longitudinal motion between the tank and the center sills whereby movement of the tank upon the center sills is retarded.

My present invention, in its preferred embodiment, constitutes an improvement upon the structure shown in my co-pending application, and the nature of the present invention will be best understood by reference to the accompanying drawing showing the preferred embodiment thereof and in which—

Figure 1 is a side view of a portion of the structure with some parts in section; Fig. 2 is a sectional view on line 2—2 of Fig. 1; Fig. 3 is a sectional view on line 3—3 of Fig. 1; and Fig. 4 is a side view of a tank car supported in accordance with the invention.

Like parts are indicated by similar characters of reference throughout the different figures.

The tank or car body supporting structure and the wheels $a$ forming a part thereof are sufficiently shown in order that the nature of my invention may be understood, the illustration of many details being omitted as being unnecessary to an understanding of my invention. As my invention is of special utility in the construction of tank cars, the supporting structure includes two center sills $b$ that are formed of angle iron to provide outsetting flanges $c$, and which center sills are spaced apart and are disposed in the car structure in accordance with the practice that is now common in tank car construction. The end portions of the tank $d$ have sliding mounting upon the top outsetting flanges $c$ of the center sills, which mounting is desirably secured by means of pedestals $e$ that include feet $f$ desirably rigidly secured to the bottom of the tank, to which end the pedestals may have curved rests $g$ forming integral parts thereof and which are riveted to the tank. The feet $f$ underlie washer or friction plates $h$ that are held in fixed relation with each other by vertically disposed or upright bolts $i$ whose shanks pass through closely fitting vertically alined round holes formed in the top flanges $c$ and the washers $h$. The bolt nuts $k$ are shown as underlying the top flanges $c$, the washers $l$ interposed between these nuts and flanges tapering to compensate for the taper of the flanges, as indicated most clearly in Fig. 2. Where the bolt shanks are thus held in fixed relation to the center sills and washer plates $h$, each foot $f$ has elongated openings $m$ extending longitudinally of the center sills and through which the bolt shanks pass, the openings $m$ being sufficiently long to permit of desired movement of the tank longitudinally of the center sills, sufficiently wide to permit of such longitudinal tank movement without binding, and sufficiently narrow to prevent movement of the tank transversely of the center sills. The nuts $k$ are tightened sufficiently to prevent the tank from rising bodily from the center sills, yet permitting movement of the tank longitudinally of the center sills. Owing to the clamping action of the bolts, the top surfaces of the feet f have frictional engagement with the bottom surfaces of the washers h and the bottom surfaces of said feet have frictional engagement with the top surfaces of the top flanges c, whereby the movement of the tank is properly retarded to check the movement of the tank with sufficient slowness to prevent the rivets which unite the tank with the curved rests g from being sheared. I have shown four pedestals e, two upon each side of the tank near its ends. Each pedestal is, in the embodiment of the invention shown, in movable relation with a plurality of bolts i that have a common washer h fixed with respect to the bolts to increase the friction, though I do not wish to be limited to the employment of washers h which are common to a plurality of bolts.

In the preferred form of the invention the shanks of the bolts or other fastening members i are not capable of having violent contact at the ends of the elongated apertures m in the feet f, to which end buffers are employed which may be in the form of stop plates or lugs n between which the group of four pedestals f intervenes and which may be rigidly secured to the top flanges of the center sills, the lugs n at one end of the car or the other being engaged by the feet f when the limit of tank travel has been reached then to prevent the bolts i from being subject to shearing strain.

While I have herein shown and particularly described the preferred embodiment of my invention I do not wish to be limited to the precise details of construction shown as changes may readily be made without departing from the spirit of my invention.

Having thus described my invention I claim as new and desire to secure by Letters Patent the following:—

1. A car structure including a tank; a pair of center sills for supporting the tank; pedestals carrying the tank at their upper ends and in sliding relation to and slidable longitudinally of the center sills, said pedestals being provided with feet whose lower surfaces engage the tops of the center sills; friction plates engaging the upper surfaces of the feet; and means for holding said friction plates and center sills simultaneously in frictional engagement with the pedestal feet.

2. A car structure including a tank; a pair of center sills for supporting the tank; pedestals carrying the tank at their upper ends and in sliding relation to and slidable longitudinally of the center sills, said pedestals being provided with feet whose lower surfaces engage the tops of the center sills; friction plates engaging the upper surfaces of the feet; and means for holding said friction plates and center sills simultaneously in frictional engagement with the pedestal feet and in substantially fixed relation with each other.

3. A car structure including a tank; a pair of center sills for supporting the tank and provided with top flanges; pedestals supporting the tank at their upper ends and in sliding relation to and slidable longitudinally of the center sills, said pedestals being provided with feet whose lower surfaces frictionally engage said center sill flanges; friction plates engaging the upper surfaces of the pedestal feet; and bolts passing through the center sills and operating to hold the friction plates and center sill flanges simultaneously in frictional engagement with the pedestal feet.

4. A car structure including a tank; a pair of center sills for supporting the tank and provided with top flanges; pedestals supporting the tank at their upper ends and in sliding relation to and slidable longitudinally of the center sills, said pedestals being provided with feet whose lower surfaces frictionally engage said center sill flanges; friction plates engaging the upper surfaces of the pedestal feet; and bolts passing through the center sills and operating to hold the friction plates and center sill flanges simultaneously in frictional engagement with the pedestal feet, said bolts being in substantially fixed relation with the center sills and friction plates.

5. A car structure including a tank; a pair of center sills for supporting the tank and provided with top flanges; pedestals supporting the tank at their upper ends and in sliding relation to and slidable longitudinally of the center sills, said pedestals being provided with feet whose lower surfaces frictionally engage said center sill flanges; friction plates engaging the upper surfaces of the pedestal feet; bolts passing through the center sills and operating to hold the friction plates and center sill flanges simultaneously in frictional engagement with the pedestal feet; and means for limiting the movement of the tank independently of said bolts to relieve the bolts of shearing strain.

6. A car structure including a tank; a pair of center sills for supporting the tank and provided with top flanges; pedestals supporting the tank at their upper ends and in sliding relation to and slidable longitudinally of the center sills, said pedestals being provided with feet whose lower surfaces frictionally engage said center sill flanges; friction plates engaging the upper surfaces of the pedestal feet; bolts passing through the center sills and operating to hold the friction plates and center sill flanges simultaneously in frictional engagement with the pedestal feet, said bolts being in substantially fixed relation with the center sills and friction plates; and means for limiting the movement of the tank independently of said body to relieve the bolts of shearing strain.

7. A car structure including car body; a support for the car body; a pedestal structure by which the car body is mounted upon its support, said pedestal structure having a foot formation resting upon and in sliding frictional engagement with the car body support to permit the car body to move longitudinally of its support; friction producing means engaging the upper portion of said foot formation; and means for holding said friction producing means and the car body support simultaneously in frictional engagement with said foot formation.

In witness whereof, I hereunto subscribe my name this 24th day of March A. D., 1913.

CHARLES A. SHOEMAKER.

Witnesses:
G. L. CRAGG,
E. L. WHITE.